United States Patent [19]
Gooch

[11] Patent Number: 5,774,311
[45] Date of Patent: Jun. 30, 1998

[54] SMALL CORE MAGNETIC HEAD WITH NON-MAGNETIC SIDE SUPPORT

[75] Inventor: Beverley R. Gooch, Sunnyvale, Calif.

[73] Assignee: Ampex Corporation, Redwood City, Calif.

[21] Appl. No.: 822,884

[22] Filed: Mar. 24, 1997

Related U.S. Application Data

[63] Continuation of Ser. No. 543,249, Oct. 13, 1995, abandoned.

[51] Int. Cl.⁶ .................................................. G11B 5/127
[52] U.S. Cl. ................................................................ 360/125
[58] Field of Search .................................. 360/125, 126, 360/122, 127

[56] References Cited

U.S. PATENT DOCUMENTS

| | | | |
|---|---|---|---|
| 2,711,945 | 6/1955 | Kornei | 360/122 |
| 3,140,361 | 7/1964 | Eldridge | 360/125 |
| 3,549,822 | 12/1970 | Chupity | 360/121 |
| 3,566,045 | 2/1971 | Paine | 360/122 |
| 3,651,278 | 3/1972 | Chupity et al. | 360/123 |
| 4,219,853 | 8/1980 | Albert et al. | 360/103 |
| 4,242,711 | 12/1980 | Sata et al. | 360/126 |
| 4,404,608 | 9/1983 | Yasuda et al. | 360/126 |
| 4,635,153 | 1/1987 | Shimamura et al. | 360/125 |
| 4,638,811 | 1/1987 | Diepers et al. | 128/673 |
| 4,667,260 | 5/1987 | Parlov et al. | 360/122 |
| 4,710,838 | 12/1987 | Jahnke | 360/125 |
| 4,716,484 | 12/1987 | Kaminaka et al. | 360/125 |
| 4,780,779 | 10/1988 | Pisharody et al. | 360/120 |
| 4,782,416 | 11/1988 | Hillenbrand et al. | 360/125 |
| 4,811,146 | 3/1989 | Niwa | 360/119 |
| 4,819,112 | 4/1989 | Iwata et al. | 360/126 |
| 4,819,113 | 4/1989 | Kubota et al. | 360/126 |
| 4,837,924 | 6/1989 | Lazzari | 360/125 |
| 4,839,763 | 6/1989 | Matsuzawa | 360/126 |
| 4,868,698 | 9/1989 | Takahashi et al. | 360/126 |
| 4,873,599 | 10/1989 | Sueoka | 360/126 |
| 4,888,658 | 12/1989 | Oneo et al. | 360/126 |
| 4,901,179 | 2/1990 | Satomi et al. | 360/126 |
| 5,057,957 | 10/1991 | Ito et al. | 360/125 |
| 5,157,569 | 10/1992 | Kumasaka et al. | 360/126 |
| 5,162,960 | 11/1992 | Sakata et al. | 360/127 |
| 5,227,940 | 7/1993 | Isomura et al. | 360/125 |
| 5,276,578 | 1/1994 | Kato et al. | 360/125 |
| 5,285,342 | 2/1994 | Matsuzawa et al. | 360/125 |

FOREIGN PATENT DOCUMENTS

A 0 061 069  9/1982  European Pat. Off. .

OTHER PUBLICATIONS

The Complete Handbook of Magnetic Recording, 3rd Ed., Finn Jorgensen, 1988 pp. 204 through 208.

Magnetic Recording, vol. 1, Technology, 1987, C. Denis Mee & Eric D. Daniel pp. 315 through 325.

Videotape Recording, Ampex Corporation, 1986, pp. 43 through 46.

Phillips Technical Review, vol. 44, No. 5, Nov., 1988, pp. 151–160, by J.P.M. Verbunt, 'Laboratory–scale manufacture of magnetic Heads'.

Patent Abstracts of Japan, vol. 14, No. 230 [P–1048] [4173], 16 May 1990, & JP, A, 20 54 407 [Nex Knasai Ltd.] 23 Feb. 1990.

Patent Abstracts of Japan, vol. 11, No. 066 [P–552] 27 Feb. 1987 & JP, A, 61 229 210 [Canon Electronics, Inc.] 13 Oct. 1986.

(List continued on next page.)

Primary Examiner—Stuart S. Levy
Assistant Examiner—David D. Davis
Attorney, Agent, or Firm—John G. Mesaros; James M. Thomson

[57] ABSTRACT

A head having very low leakage flux loss since the head is constructed with a very small elongate magnetic intercore, having a winding window formed therein if desired, with the intercore being supported on either side by non-magnetic side support blocks. The side support blocks enable mounting of the head to the usual style of head block and provide the physical structure and size necessary for formation of a low wear head profile, if desired.

6 Claims, 6 Drawing Sheets

OTHER PUBLICATIONS

Patent Abstracts of Japan, vol. 14, No. 534 [P–1135 ] 26 Nov. 1990 & JP, A, 22 26 508 [Nippon Chemicon Corp.] 10 Sep. 1990.

Patent Abstracts of Japan vol. 8, No. 75 [P–266][1512] 7 Apr. 1984 & JP, A, 58 220 232 [Nippon Victor K.K.] 21 Dec. 1983.

Patent Abstracts of Japan, vol. 13, No. 361 [P–917] 11 Aug. 1989 & JP,A, 11 19 904 [Sony Corp.] 12 May 1989.

Patent Abstracts of Japan vol. 15, No. 343 [E–1106] 30 Aug. 1991 & JP,A, 31 31 006 [Alps Electric Co. Ltd.] 4 Jun. 1991.

SMALL CORE MAGNETIC HEAD WITH NON-MAGNETIC SIDE SUPPORT

This is a continuation of application Ser. No. 08/543,249 filed Oct. 13, 1995.

BACKGROUND OF THE INVENTION

1. Field of the Invention

The present invention relates to a magnetic head suitable for operation in disc or tape storage systems that accommodate either data or video signals. More particularly, the invention relates to such a head having very low leakage flux loss since the head is constructed with a very small elongate magnetic intercore, having a winding window formed therein if desired, with the intercore being supported on either side by non-magnetic side support blocks. The side support blocks enable mounting of the head to the usual style of head block and provide the physical structure and size necessary for formation of a low wear head profile, if desired.

2. State of the Art

Figure 1:
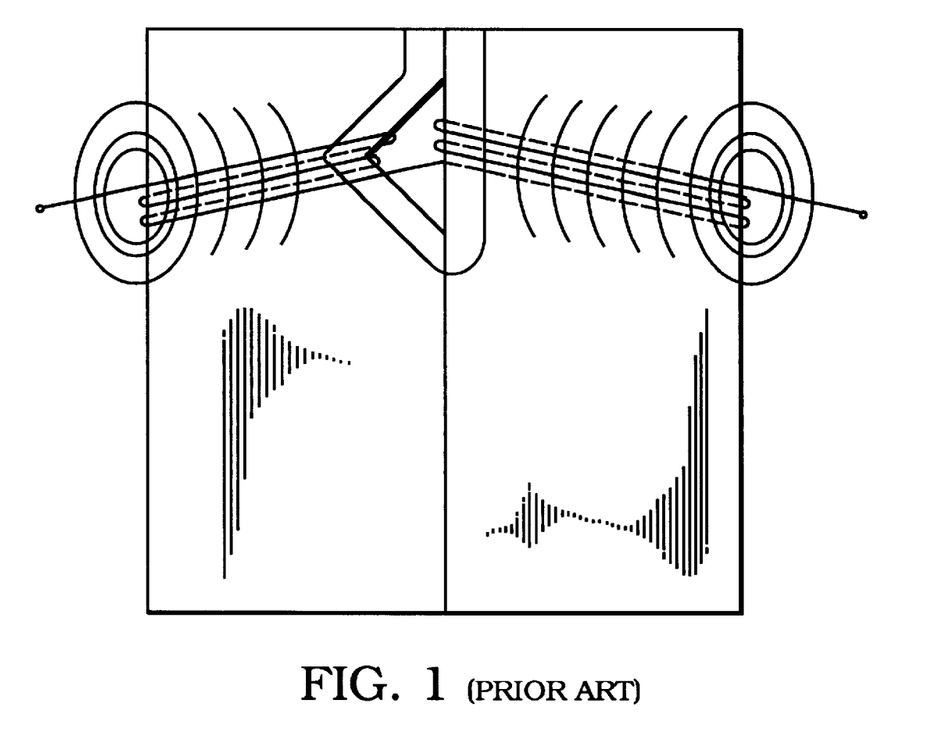
FIG. 1 is a diagrammatic view of a prior art head.

In designing video and disc heads the overall core size is determined primarily by the mounting and contour dimensions that result from head life and mounting requirements, rather than the core size necessary to obtain optimum magnetic efficiency. FIG. 1 illustrates a typical core layout and the accompanying flux paths for a magnetic head that typically might be used in either disc or tape storage applications for video or data information. The head flux that contributes ninety percent of the head magnetizing inductance and output voltage occurs in the region proximate to the winding window of the head (i.e. the region approximately 5 to 10 mils wide represented by the shaded periphery of the winding window as illustrated in FIG. 1).

Unfortunately, since the windings of the coil extend around the entire width of the magnetic core, a significant amount of flux exists in other regions of the core. This flux fails to contribute significantly to the head output. Rather, it constitutes leakage flux that produces leakage inductance as opposed to magnetizing inductance in the core. The leakage inductance only serves to raise the overall head impedance and add to the noise of the head. In fact, the leakage inductance for some typical heads in current use with disc or tape storage systems has been found to equal or exceed the magnetizing inductance of the core, particularly when the flux is measured at the high frequencies at which current heads typically operate.

U.S. patent application Ser. No. 916,321 filed Jun. 17, 1992 for Composite Metal and Ferrite Head Transducer and Manufacturing Method Therefore, by Beverley R. Gooch and Rex Neidermeyer, assigned to the same assignee as the present invention, discloses an advanced head core that performs well during high frequency operation at current storage densities, but which still exhibits loss characteristics that might detract from its use in higher density recording for which commercial demand now exists. A continuation-in-part application, Ser. No. 287,459, of the parent application was filed on Aug. 8, 1994, and is incorporated by reference for certain portions of the head structure and process disclosure contained therein.

SUMMARY OF THE INVENTION

It is an object of the invention to provide a transducer with reduced leakage inductange and lower overall inductance.

It is another object of the invention to provide an improved magnetic head having a small intercore section that is supported on either side by non-magnetic side blocks.

In order to construct a head in accordance with these objects, the side blocks and the head intercore are formed of compatible material and sized such that the head can be conveniently mounted in the usual size head shoe or slider. Moreover, the head profile can still include a wear resistant profile or media bearing surface of the usual size and shape. The reduction in magnetic core size that results from the use of non-magnetic side block results in a corresponding reduction in flux loss (i.e. potentially as high as 50%) in the head design and results in a significant performance improvement with respect to high frequency operation. This, in turn, results in feasibility for higher density recording applications for the improved head than were heretofore possible.

BRIEF DESCRIPTION OF THE DRAWINGS

These and other features and advantages of the invention are illustrated in the accompanying drawings in which.

DETAILED DESCRIPTION OF THE INVENTION

Figures 2, 3:
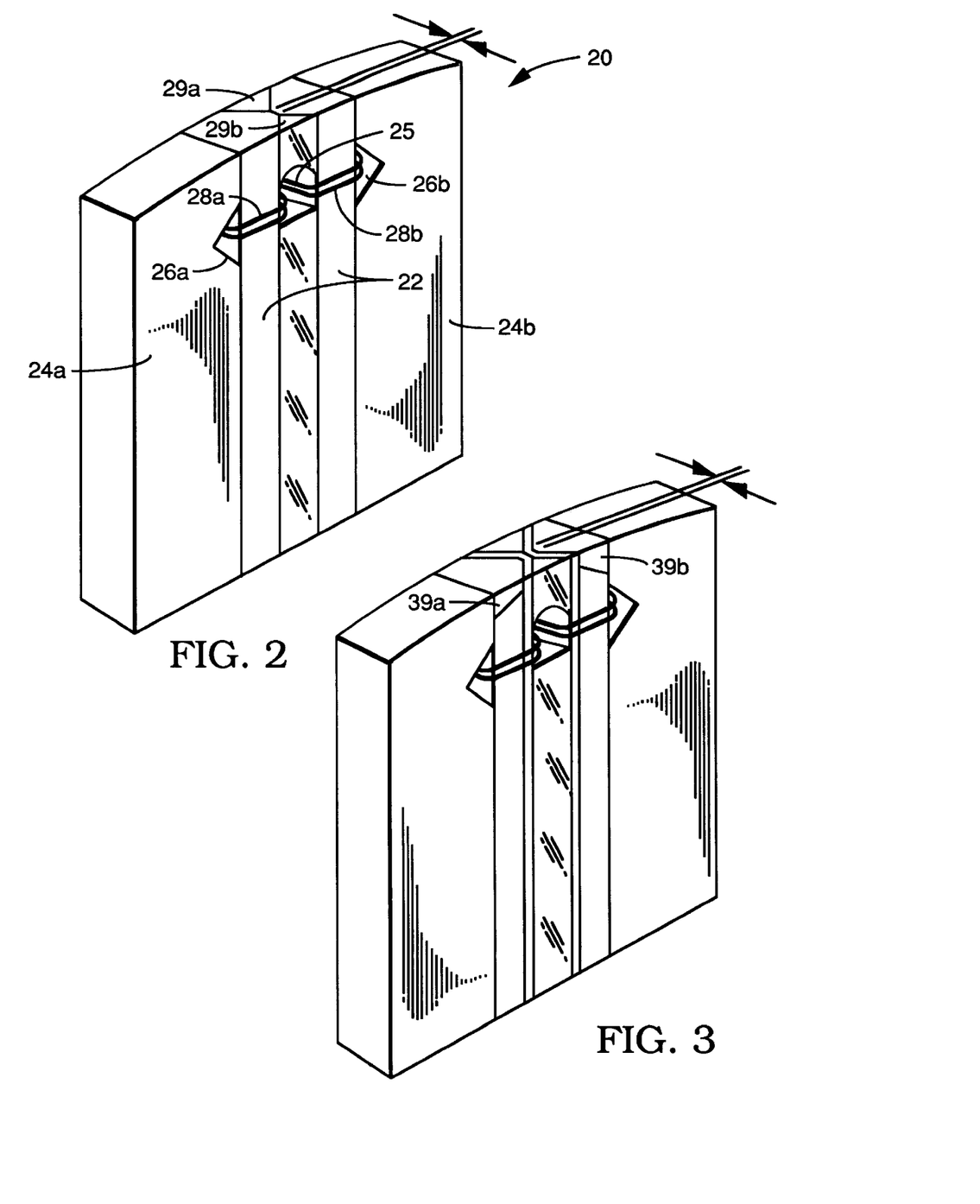
FIG. 2 is a perspective view of a head comprising one preferred embodiment of the invention.
FIG. 3 is a perspective view of a head comprising another embodiment of the invention.

Referring now to FIG. 2, an improved head 20 designed in accordance with the invention is illustrated, generally comprising an elongate intercore 22 having non-magnetic side blocks 24a, 24b secured on either side thereof. A small winding window 25 is formed through the body of the intercore, and small, generally triangular winding windows 26a, 26b are formed along the edges of side blocks 24a, 24b, respectively so that windings 28a, 28b encompass the full cross section of the magnetic material within the intercore adjacent to the winding window.

In the embodiment of FIG. 2, the intercore is generally constructed of two half blocks of magnetic material, such as ferrite, of the cross section illustrated, which are glass bonded together with their respective track width lands in facing relationship to form the magnetic gap of the head. The side portions of the intercore adjacent to the gap, i.e. the notches of the head, are filled with flowable soft glass inserts 29a, 29b. The glass is preferably a hi-lead composition glass, having a flow temperature in the vicinity of 550 degrees C. to generally match the thermal expansion characteristics of ferrite.

The intercore material for the embodiment of FIG. 2 is Manganese Zinc (MnZn) ferrite and the side blocks are formed of Calcium Titanate (CaTi) which has a wear rate and other structural and thermal expansion characteristics that generally match those of ferrite, so that the upper surface of the head can be suitably shaped with a contour extending across the entire upper surface of the head that will contact the tape or fly above the disc, depending upon the type of storage system within which the head is utilized.

In the FIG. 2 embodiment 45–50 gauge copper wire is suitable for the coils, with each coil being provided with 6 to 10 turns. The intercore material preferably has a relatively high permeability at the operating frequency off the head, for example with MnZn a DC permeability of 5000 and 300–400 at 10 MHZ. The intercore is fabricated with a length at least twice its width. Consequently, the dimensions of the side blocks on either side of the intercore are shown to generally exceed the width of the intercore. This, along with the dimensions of the winding windows, ensures that the side dimension of the ferrite core on either side of the winding window is reduced to about 5 mils, which is close to the ideal. A preferred range for this dimension would be 3 to 12 mils. It should be apparent that the size of the winding window can be adjusted in either direction to determine the core cross section that acts as a flux path, or the length of the flux path, respectively. Otherwise, the winding window is kept to minimum size as required by the number of winding turns therein.

As a result of the small side dimension of the core pieces, the head coil length is also reduced and most of the head flux is forced through the path close to the winding window. This, in turn, results in a substantial reduction of the leakage paths that are present in standard heads, in particular those having a profile similar to that illustrated in FIG. 1. Accordingly, most of the head flux contributes to magnetizing inductance and head output voltage. This results in lower head nose and a substantially better system signal to noise ratio.

Figure 4:
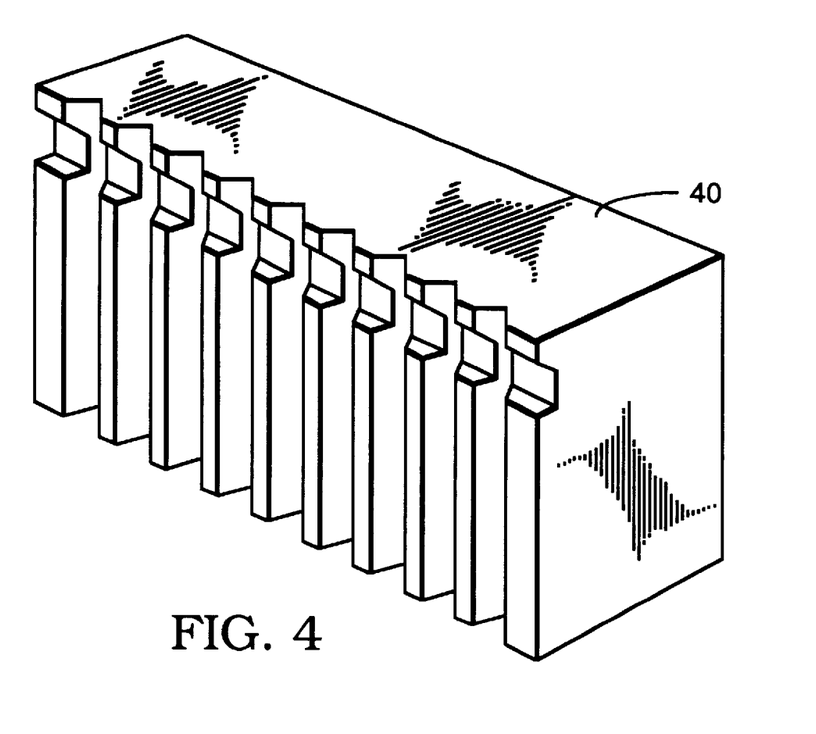
FIG. 4 is a perspective view of a block configuration used in fabrication of the head of the invention.
Figure 5:
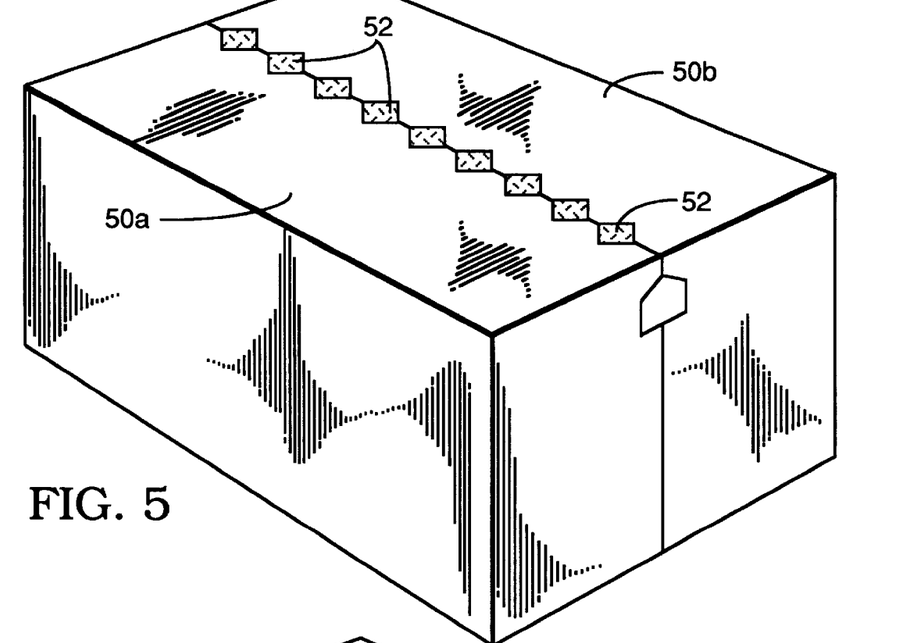
FIG. 5 is a perspective view of composite block used in fabrication of the head of the invention.
Figure 6:
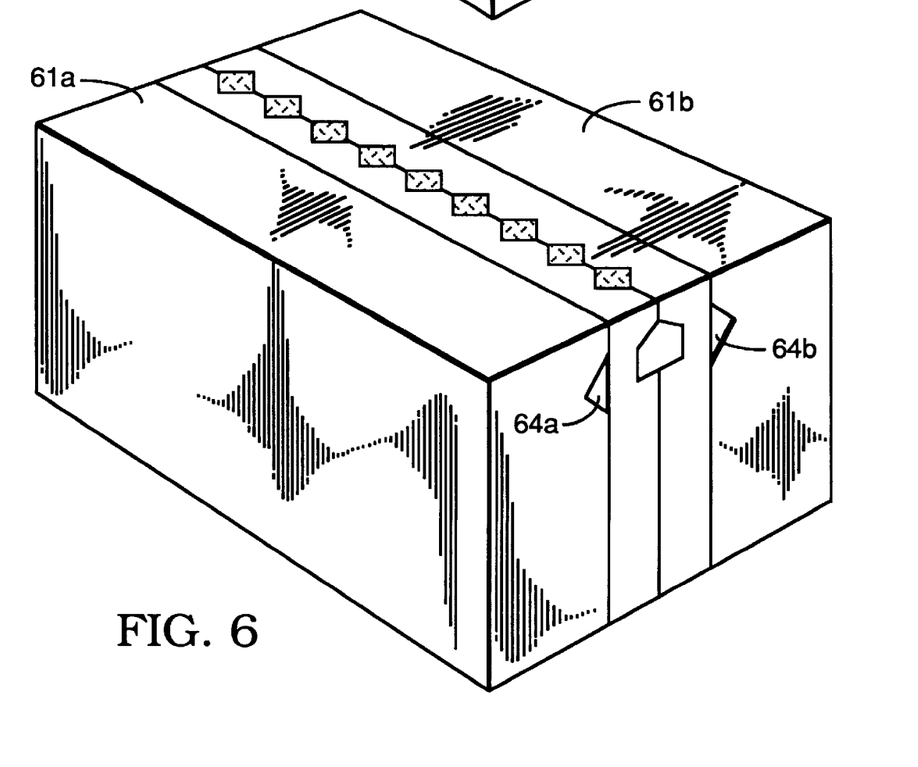
FIG. 6 is a perspective view of yet another composite block used in fabrication of the head of the invention.

Referring now to FIGS. 4–6, the method of construction of a head of the FIG. 2 embodiment will be generally described. FIG. 4 shows a ferrite half block suitable for forming as many as nine heads. As shown, the block 40 is already formed with track notches and a winding window. These features are formed by cutting them into the face of the polished ferrite core. The facing surfaces are then polished to a high finish.

FIG. 5 shows two half blocks 50a, 50b assembled in facing relationship to form the intercore structure. As indicated, the half blocks have been bonded together with a soft glass, and the track notches 52 have been filled with soft glass in a manner which is well known in the art. This may be done in a two step process, by flowing glass from the top first, and then reversing the position of the block to fill the bottom portion of the track notches with glass from the bottom.

FIG. 6 illustrates the structure that results from reducing the dimension of the intercore and bonding the non-magnetic side blocks thereto. As shown, each of the side blocks 61a, 61b is formed with a small v-shaped winding extrusion 64a, 64b that faces the intercore when the head block is finally assembled. It should be apparent that the structure of FIG. 6 is intended to be sliced into a number of identical head blanks, ready for winding and mounting on a head slider, as is illustrated in FIG. 8.

Figure 8:
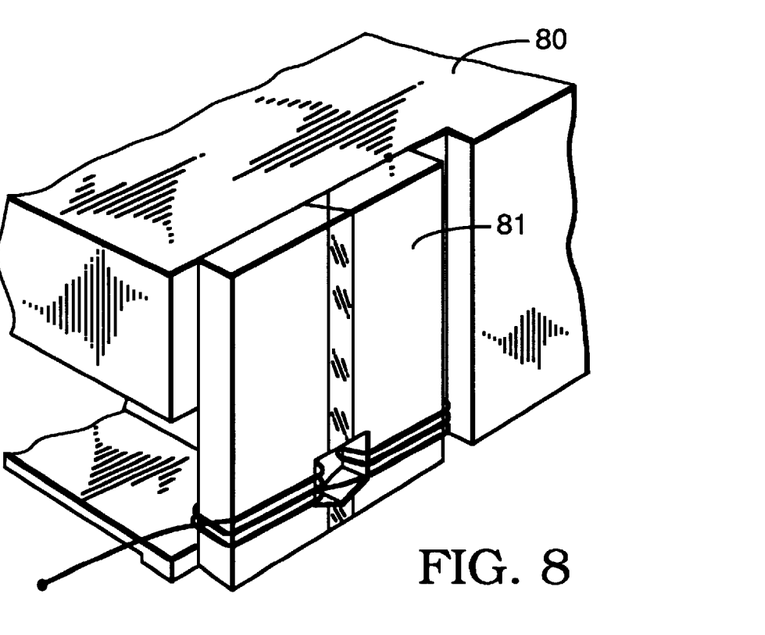
FIG. 8 is a perspective view of one of the heads of the invention mounted in a block for use in a storage system.

FIG. 8 illustrates a head slider 80 for a hard disc having an exemplary head 81 adhered thereto by suitable means.

Referring now to FIG. 3 another embodiment of the invention is illustrated wherein certain structural additions are made to the FIG. 2 embodiment. The intercore material is still MnZn ferrite. However, in FIG. 3, zirconia inserts 39a, 39b are added at the top of the intercore to act as caps for that body. The purpose of the caps is to provide a desirable material at the head contacting surface of the head. In this embodiment, zirconia caps are employed and the side blocks are also fabricated of ZrO5 or zirconia that matches the characteristics of the caps. Consequently, a suitable contour can be imparted to the surface of the head to minimize tape wear.

In addition, in order to take advantage of the features of the Gooch-Neidermeyer invention, as disclosed in the previously cited Patent Applications, certain other features were added to the FIG. 3 embodiment. In particular, when fabricating the intercore structure, a thin interface layer of chrome is first sputtered on the polished surfaces of the core halves. A film of Alfesil about 200 micro inches thick is then sputtered upon the chrome surface. After the Alfesil is deposited, a thin non-magnetic layer such as $Al_2O_3$ or $SiO_2$ is sputtered on each of the confronting Alfesil surfaces to form the head gap spacer. The core blocks are then glass bonded in the previously described fashion to complete the composite intercore structure as shown in FIG. 3.

Figure 7:
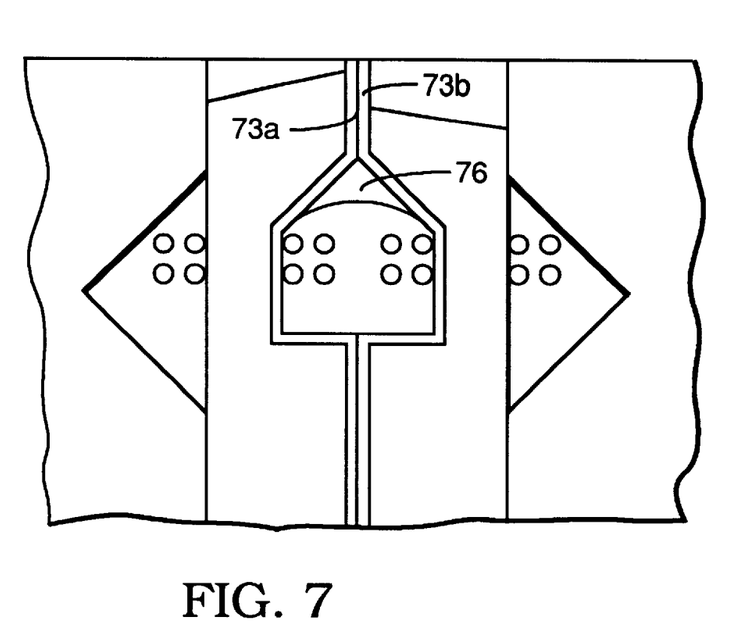
FIG. 7 is a sectional view illustrating part of the internal structure of the head illustrated in FIG. 3.

FIG. 7 illustrates the head structure of the FIG. 3 embodiment in sectional view. As shown, the alfesil layers 73a, 73b exist at the gap line and surround the winding window. Also as best seen in FIG. 7, a miniscus of glass is formed within the top half of the winding window during the process of flowing glass down from the top of the head block to fill the region beside the head gap.

The embodiment of FIG. 3 has all the advantages of the embodiment without Alfesil, and in addition has been found to have special utility in certain applications that involve higher tape wear concerns and tape noise reductions.

It should be recognized that the process for fabricating the disclosed head, and particularly the Alfesil layered version is more completely described in the copending Gooch-Neidermeyer Patent Applications. In particular, the process for adding the zirconia caps is described in detail in connection with FIG. 12 of the '459 application.

Figure 9:
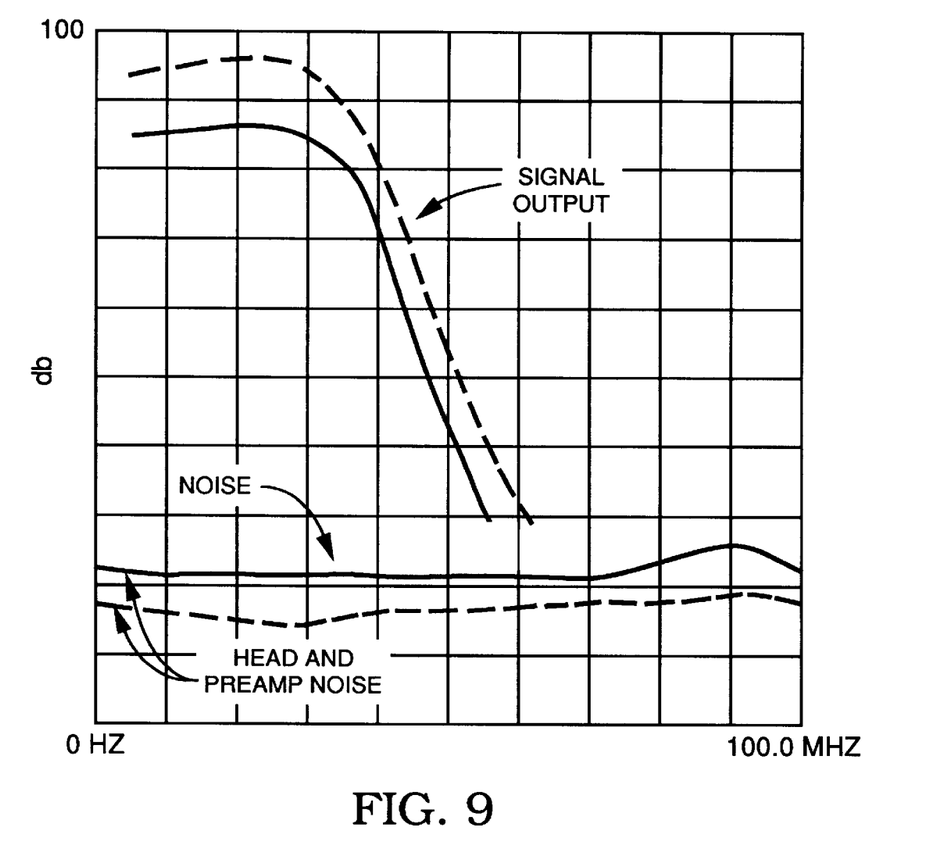
FIG. 9 is a chart illustrating the head performance characteristics of a prior art head and a head designed in accordance with the present invention.

Referring now to FIG. 9, the operating characteristics of the improved heads described herein result in an improved performance head output, as indicated by the comparison of results from the heads designed in accordance with this invention as compared to heads without a small core and non-magnetic side blocks. In FIG. 9 the dashed curve represents a signal from a head constructed in accordance with the invention and the solid curve represents a signal from a head designed in accordance with the Gooch-Neidermeyer technique referred to earlier herein. As shown, the small core head exhibits a greater signal output and lower noise than the older head. In the lower portion of FIG. 9, the curves represent a composite of both head and pre-amp noise. As shown, the small core head with its lower inductance exhibits a significantly lower noise factor than the other head. This occurs since the lower inductance of the small core head results in a lower input impedance to the pre-amp which results, in turn, in lower noise from the pre-amp.

What is claimed is:

1. A magnetic head for recording and/or reproducing high frequency signals in a pre-selected track within a magnetic recording medium, comprising;

an elongate magnetic intercore consisting of first and second elongate magnetic members bonded together along their length on each inner side of said intercore by a ceramic material extending the entire length of said magnetic members that forms a recording gap between said members, and elongate non-magnetic side blocks secured to the magnetic members on each outer side of said intercore, one end of said intercore and side block structure being shaped into a contoured medium bearing surface extending across the end of said intercore members and said adjoining side blocks, and said intercore having a winding window formed in the central portion thereof and through said gap, at a location proximate to said medium bearing surface, and said medium bearing surface including a capping layer of non-magnetic material at the top of each elongate magnetic member so as to minimize tape wear, and a winding arranged through said winding window to encompass the portion of the cross-section of each elongate magnetic member that is adjacent to the winding window, for selectively producing read and write signals within the magnetic intercore of said head upon energization by high frequency signals such that flux within the head is substantially confined to the cross-sections of the magnetic members of the intercore located adjacent to the winding window substantially reducing the leakage flux within the head.

2. The magnetic head of claim 1 wherein the width of each of the magnetic members adjacent to the winding window is in the range of 3–12 mils.

3. The magnetic head of claim 2 wherein the width of each of the magnetic members adjacent to the winding window is about 5 mils.

4. The magnetic head of claim 1 wherein the magnetic members are formed of MnZn ferrite.

5. The magnetic head of claim 1 wherein the side blocks are fabricated of CaTi.

6. The magnetic head of claim 1 wherein the side blocks are formed of zirconia.

* * * * *